United States Patent
Wang (12) 
(10) Patent No.: US 6,250,437 B1
(45) Date of Patent: Jun. 26, 2001

(54) DISC BRAKE ASSEMBLY

(75) Inventor: Nui Wang, Croydon (AU)

(73) Assignee: PBR Automotive Pty. Ltd., Victoria (AU)

( * ) Notice: Subject to any disclaimer, the term of this patent is extended or adjusted under 35 U.S.C. 154(b) by 0 days.

(21) Appl. No.: 09/058,306

(22) Filed: Apr. 10, 1998

Related U.S. Application Data (63) Continuation-in-part of application No. 08/666,394, filed as application No. PCT/AU94/00787 on Dec. 22, 1994.

(30) Foreign Application Priority Data

Dec. 22, 1993 (AU) .................................................. PM3086

(51) Int. Cl.⁷ ................................................ F16D 55/224
(52) U.S. Cl. ...................................... 188/72.5; 188/71.1
(58) Field of Search ................................ 188/71.1, 72.4, 188/72.5, 73.1, 73.2

(56) References Cited

U.S. PATENT DOCUMENTS

| | | | |
|---|---|---|---|
| 2,497,438 | * | 4/1950 | Butler ................................. 188/72.4 |
| 2,541,031 | * | 2/1951 | Butler ................................. 188/724 |
| 2,707,604 | * | 5/1955 | Dowty ................................. 188/72.5 |
| 2,963,116 | * | 12/1960 | Peras ................................. 188/370 |
| 3,424,276 | * | 1/1969 | Robinette ........................... 188/376 |
| 3,448,831 | * | 6/1969 | Newstead ............................ 188/72.5 |
| 4,460,070 | * | 7/1984 | Meyer et al. ....................... 188/72.4 |

FOREIGN PATENT DOCUMENTS

| | | |
|---|---|---|
| 134115 | 9/1949 | (AU) . |
| 137344 | 5/1950 | (AU) . |
| 147134 | 7/1952 | (AU) . |
| 1530617 | 12/1969 | (DE) . |
| 3815690 | 11/1989 | (DE) . |
| 4019792 | 7/1991 | (DE) . |
| 4015198 | 11/1991 | (DE) . |
| 0039641 | 11/1981 | (EP) . |
| 0952794 | 11/1949 | (FR) . |
| 1481530 | 5/1989 | (RU) . |

* cited by examiner

*Primary Examiner*—Matthew C. Graham
(74) *Attorney, Agent, or Firm*—Stevens, Davis, Miller & Mosher, LLP (57) ABSTRACT

A disc brake assembly is disclosed which incorporates a disc 50 which includes radially inner and outer portions (54 55) which are separated by a gap 56. Two pad assemblies (11, 12) are located on respective sides of the disc and are interconnected by a draw bar 29 which extends through the gap and is connected to a piston cylinder assembly. Actuation of the piston cylinder assembly imparts a force to the pad assemblies through the draw bar which causes them to move either towards or away from the disc to thereby effect actuation and release of the brake assembly. The draw bar is rotatable about its axis 71 and is releaseably coupled to the outboard pad assembly 12 so as to be operative to move between an engaged configuration with the pad assembly to a released configuration on rotation about the draw bar axis.

32 Claims, 8 Drawing Sheets

DISC BRAKE ASSEMBLY

This application is a continuation-in-part of U.S. patent application Ser. No. 08/666,394 incorporated herein by reference in its entirety, which is a 35 USC §371 National Phase filing of PCT/AU94/00787, filed Dec. 22, 1994.

The invention relates to disc brakes, and is particularly but not exclusively concerned with such brakes as used with motor vehicles. It will be convenient to hereinafter describe the invention by reference to motor vehicle wheel brakes, but it is to be understood that the invention has wider application.

In a typical disc brake assembly for a motor vehicle, a caliper bridge is arranged to straddle a rotatable disc. The bridge incorporates inboard and outboard portions each of which incorporates an associated friction pad. The portions are able to move relative to one another to enable the friction pads to engage opposite faces of the disc under the influence of a hydraulic piston cylinder assembly acting on the inboard portion.

In operation, stresses are induced in the brake assembly which cause deflection of the caliper. In one form of deflection, the caliper may stretch in an axial direction, i.e. in a direction parallel to the axis of rotation of the disc. In another form, the caliper may yawn or splay under load causing uneven loading to be applied to the disc by the pad assemblies. Furthermore, the caliper may tilt relative to the axis of the rotation of the disc causing the pads to tend to taper after continued use. These deflections are undesirable as they increase the fluid required to actuate the brakes, cause variations in the specific torque output of the brake assembly under different loadings, and result in uneven wearing of the pads.

To compensate for the effects of this loading, different caliper designs have been proposed to minimise the deflection of the caliper. However, these designs have not been completely effective in stopping deflection of the caliper. Furthermore, these designs often add to the weight of the assembly, the complexity of its manufacture and the manufacturing costs. In addition these assemblies are often unable to dissipate heat as effectively due to the additional structure provided to make the brake assembly stiffer.

An aim of the present invention is to provide a disc brake assembly which is better able to accommodate the stresses induced in use of the brake assembly. It is a further aim of the invention to provide a disc brake assembly which has enhanced characteristics over prior art brake assemblies in relation to the cost of manufacture, its weight, serviceability and efficiency in dissipating heat.

In a first aspect, the present invention provides a disc brake assembly including, a disc having an axis of rotation and including a radially outer portion and a radially inner portion, a gap forming a radial separation between the outer and inner portions and extending in a continuous circle co-axial with the axis of rotation, two pad assemblies located on respective opposite sides of the disc and each being mounted for movement towards and away from the disc, and actuating means operable to cause each pad assembly to move towards and engage the respective adjacent side of the disc and including force transmitting means which extends through the gap and provides at least part of an interconnection between the pad assemblies such that one responds to movement of the other towards or away from the disc, wherein the actuating means includes a piston cylinder assembly in which the piston is movable relative to the cylinder along a movement axis, either the cylinder or the piston being connected to the other pad assembly for movement therewith, and the force transmitting means including a draw bar extending co-axial with the movement axis and connecting either the piston or the cylinder respectively to the pad assembly.

Preferably each pad assembly overlies part of each of the outer and inner disc portions and is engagable with the outer and inner portions on respective sides of the disc.

By locating the force transmitting means to extend through the gap in the disc, a caliper bridge is no longer required. Furthermore when each pad assembly is engagable with both the outer and inner disc portions, the brake assembly is better able to accommodate the loads induced in operation of the assembly as the bending moment on the force transmitting means generated by the contact surface which is at a radially outer side of the force transmitting means is offset by the bending moment generated by the contact surface at the radially inner side. Furthermore, with the draw bar extending along the axis of movement of the piston relative to the cylinder, bending stresses acting on the force transmitting means are minimised and the clamping load in the brake assembly is able to be transferred substantially along the force transmitting means. Consequently, the bending moment in the force transmitting means is reduced or even eliminated as compared to a conventional caliper bridge.

The individual pad assemblies include a section of friction material, with a surface of the friction material forming an operative surface of the respective pad assembly. Each pad assembly may incorporate separate sections of friction material, each of which has a discrete operative surface. However, for the purposes of this specification, the discrete operative surfaces of a respective pad assembly shall be collectively referred to as "an operative surface" for that pad assembly and may be considered as a single entity which has an outer perimeter defined by outer edges of the discrete operative surfaces.

The force transmitting means is operable to apply a force to a region of the operative surface of one of the pad assemblies at a location substantially coincident with the centre of that region. An advantage of invention is that as the draw bar extends through the pad assemblies, the draw bar can be connected to the other pad assembly at a position which provides a preferred load distribution on the support member of that pad assembly. In this way, deflection of the pad assembly in operation of the assembly may be minimised.

In a further aspect, the present invention provides a disc brake assembly including, a disc having an axis of rotation and including a radially outer portion and a radially inner portion, a gap forming a radial separation between the outer and inner portions and extending in a continuous circle coaxial with the axis of rotation, two pad assemblies located on respective opposite sides of the disc and each being mounted for movement towards and away from the disc, an actuating means operable to cause each pad assembly to move towards and engage a respective adjacent side of the disc and including force transmitting means which extends through the gap and provides at least part of an interconnection between the pad assemblies such that one responds to movement of the other towards or away from the disc, wherein the actuating means includes a piston cylinder assembly in which the piston is moveable relative to the cylinder, either the cylinder or the piston being connected to the other pad assembly for movement therewith and the force transmitting means includes a draw bar which extends along an axis and connects either the piston or the cylinder respectively to the one pad assembly, the draw bar being rotatable about its axis and being releasably coupled to the one pad assembly so as to be operative to move between an engaged configuration with the one pad assembly to a released configuration on rotation about the draw bar axis.

This arrangement has significant practical benefit as it allows for a secure connection between the draw bar and the one pad assembly which can be easily released or engaged by rotation of the drawbar about its axis, thereby contributing both to the safety of the assembly as well as its serviceability.

In a preferred form, the one pad assembly includes a passage adapted to receive a first end of the draw bar, the draw bar includes at or adjacent this first end at least one abutment surface disposed radially outwardly from the draw bar axis and which faces towards the piston cylinder assembly. The disc brake assembly is configured such that in the engaged configuration, the abutment surface engages with a complementary abutment surface of the one pad assembly so as to prevent removal of the draw bar from the passage and wherein when in the released configuration, the abutment surface is locatable within the passage so as to enable the draw bar to be released from the one pad assembly via the passage.

In a preferred form, the assembly further includes a retaining device operable to inhibit rotation of the draw bar when in engagement with the one pad assembly. Further, the assembly preferably includes biasing means to bias the draw bar towards the one pad assembly when in this engaged configuration.

The retaining device prevents unwanted draw bar rotation whereas the biasing means has a dual function of preventing rattle in the assembly as well as maximising the retraction of the one pad assembly on release of the brakes. The retaining device and the biasing means may be combined in a single component or separate components can be used for each device. Furthermore either of these devices can form an integral part of the one pad assembly or may be provided separately such as by a bolt on or a clip on feature.

In one form, the retaining device comprises a clip connected to or integrally formed with the one pad assembly, the clip includes a resiliently deformable body which includes at least one cavity adapted to receive a part of the draw bar. The cavity incorporates an inner surface which is engagable with the draw bar to inhibit rotation of the draw bar about its axis. In one form the biasing means is formed as part of the clip and includes an abutment member which abuts the draw bar so as to bias the draw bar into engagement with the one pad assembly. In one arrangement, the clip is caused to deform when the draw bar is captured within the cavity to apply the loading to bias the abutment member into engagement with the draw bar.

In a preferred form, the draw bar includes a plurality of abutment surfaces angularly spaced about the draw bar axis. In one form, the draw bar includes a T-shaped head having a pair of abutment surfaces spaced apart about the draw bar axis by approximately 180°.

Preferably, the one pad assembly includes a support member having opposite first and second major surfaces. A friction lining is connected to or integrally formed with the support member along the first major surface to form an operative surface of the pad assembly and wherein the passage extends through the operative surface and at least into the support member. Preferably the passage extends through to the second major surface of the support member to thereby enable the first end of the draw bar to be accessed from the second major surface. Preferably in this arrangement the first end further includes a drive coupling operative to transmit loading to rotate the draw bar about its axis.

In a preferred form of this aspect of the invention, the piston is movable relative to the cylinder along a movement axis and the draw bar extends co-axial with this movement axis.

Preferably, the brake assembly according to either aspect of the invention detailed above further incorporates an anchor bracket which is securable to a support structure and includes a body on which one of the pad assemblies is mounted to accommodate torque forces generated in use of the assembly. Preferably the bracket includes a pair of support elements which extend through the gap and are connected to the other pad assembly to at least assist in guiding movement of that pad assembly.

In a further aspect of the invention a brake sub assembly is provided for use in any of the forms of the disc brake assembly described above. The brake sub assembly includes the brake pad assemblies, actuating means and force transmitting means which is operable to pass through the brake pad assemblies to provide at least part of the interconnection between the pad assemblies.

In yet a further aspect the present invention provides a brake pad assembly for use in a disc brake assembly having an axis of rotation, the pad assembly including a support member and a friction lining connected to or integrally formed with the support member, a surface of the friction lining forming an operative surface of the pad assembly having relative to the axis of rotation, a radially outer and a radially inner edge interconnected by two side edges, the pad assembly incorporating at least one passage extending through said friction lining and at least into the support member, the or each passage being arranged to receive an end of a draw bar operable to impart an actuating force to said pad assembly, wherein the passage is of non circular cross section and the pad assembly includes at least one abutment surface disposed adjacent the or each passage which is operative to engage with a complimentary abutment surface of the draw bar to couple the pad assembly to the draw bar.

Preferably the brake pad assembly includes a retaining device operative to inhibit rotation of the draw bar relative to the pad assembly when in engagement with the abutment surface.

Preferably the support member includes a first major surface on which the friction lining is located and a second major surface opposite the first surface, and the passage extends through the support member to the second major surface. Preferably the passage includes a central axis and is configured to include a slot which extends radially to said central passage and which allows an end of the draw bar to be received in the passage. Preferably the abutment surface is angularly spaced from the radial slot so that the draw bar can engage with the abutment surface on rotation about the central axis of the passage.

In a preferred form, the passage is elongate having relative to its axis, a first radial dimension which is larger than an orthogonal second radial dimension. In this arrangement the radial slot extends in the direction of the first radial dimension and a pair of abutment surfaces are preferably spaced apart in the direction of the second radial dimension and disposed on respective opposite sides of the slot.

In a preferred form, the retaining device is in the form of a clip including a resiliently deformable body which includes at least one cavity adapted to receive a part of the draw bar, the cavity includes an inner surface which is engagable with the draw bar to inhibit rotation of the draw about the passage axis. Preferably the clip further includes an abutment member which is adapted to be biased into engagement with an end of the draw bar so as to bias the draw bar into engagement with the one pad assembly.

Preferably a region of the operative surface corresponds to the or each passage, each region being approximately a size proportional to an expected actuation load induced on the operative surface by the force transmitting element received within the respective passage and wherein, the or each passage is located substantially at the centre of that region. Further, the passage may extend to an edge of the pad to thereby facilitate lateral release of the pad from the force transmitting element.

The friction lining may also be separated into two parts by a space which extends circumferentially to the rotational axis of the disc with each part of the friction lining being engagable with a respective one of two radially separated portions of the disc.

Preferably each side edge of the support member also includes an abutment surface, these abutment surfaces being engagable with respective support elements of the disc brake assembly to transfer torque loading from the disc brake assembly to the support elements. In one form the abutment surfaces are located in recesses formed on the side edges of the support member. In another form, the abutment surfaces are formed on protrusions which extend from the side edges, Preferably the friction lining also includes at least one radially extending channel extending across the operative surface to promote heat dissipation at the operative surface. Preferably the or each passage communicates with the channel or at least one of the channels formed in the friction lining.

In yet a further aspect the invention provides a disc for a disc brake assembly, the disc being rotatable about an axis of rotation and including a radially outer portion and a radially inner portion, each of the outer and inner portions having a braking surface on each of two opposite sides thereof and a gap forming a radial separation between said outer and inner portions and extending in a continuous circle co-axial with said axis of rotation, and connecting means spaced from the braking surfaces and interconnecting the inner and outer portions of the disc, the connecting means being in the form of a bracket located on one side of the disc, the bracket being spaced from the braking surface on that side of the disc to form a cavity in which a brake pad assembly is able to be located, the bracket further incorporating at least one passage providing access to the cavity.

Preferably the braking surfaces are provided on both the inner and outer portion and when used with a brake pad assembly as described above, the respective braking surfaces provide suitable engagement surfaces for the operative surfaces of the respective brake pad assemblies. Furthermore, the force transmitting means and the anchoring bracket are able to pass through the aperture in the disc, without inhibiting rotation of the disc.

Preferably there are a plurality of passages formed in the bracket. This arrangement also assists in ventilation of the assembly.

In a further aspect, the invention relates to a method of forming a disc of the above type. The disc may be formed in one piece or may be formed in separate pieces with the aperture and the contact surfaces machined by any or all of grinding, turning and milling of the disc.

It will be convenient to hereafter describe various embodiments of the invention in greater detail with reference to the accompanying drawings. The particularity of these drawings in the related description is not to be understood as superseding the generality of the preceding broad description of the invention.

Figure 1:
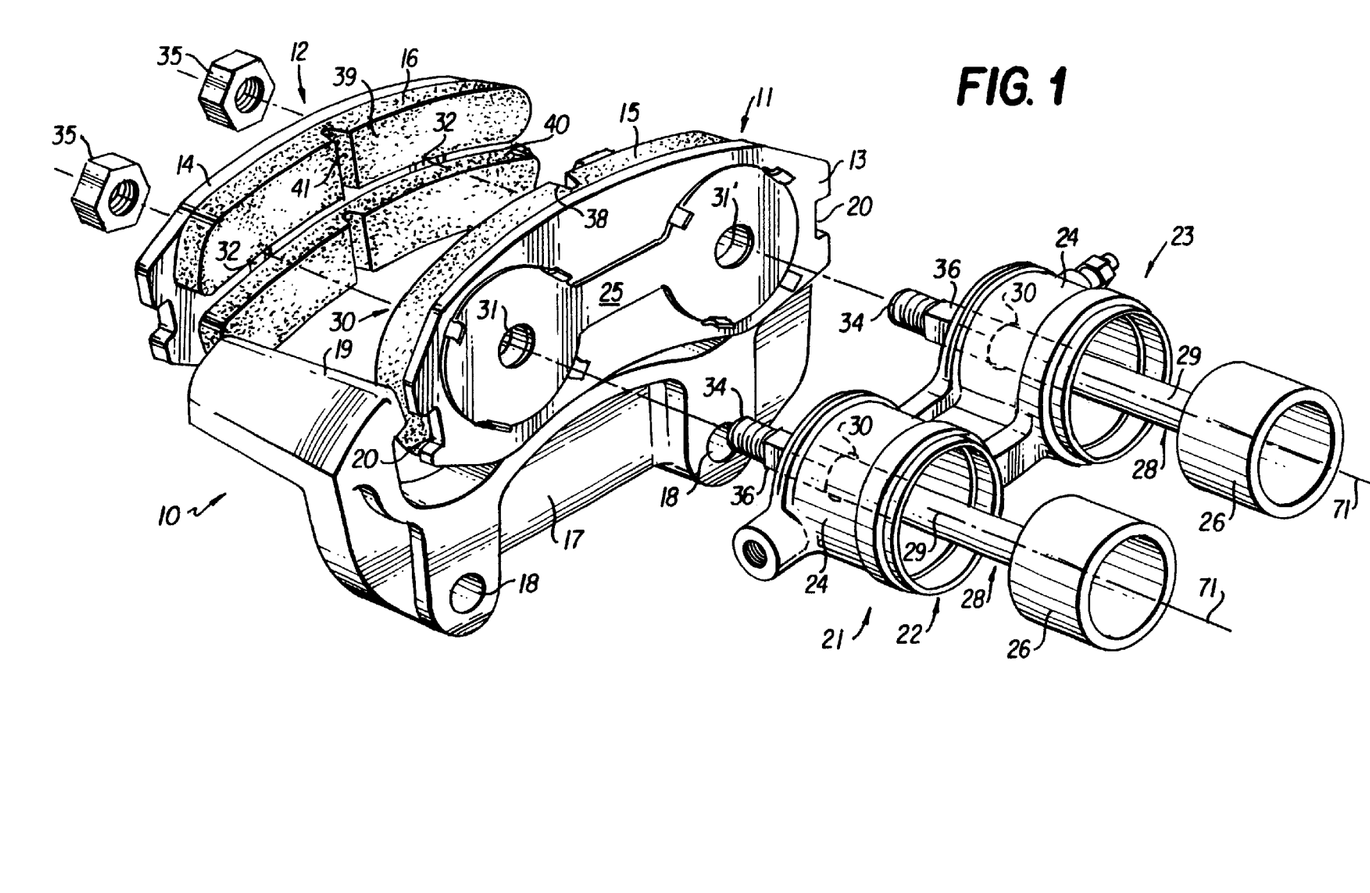
FIG. 1 is an exploded perspective view of a sub assembly for a disc brake assembly according to a first embodiment of the invention.

In the drawings:

FIG. 1 illustrates a sub assembly 10 of a disc brake assembly 100 according to an embodiment of the invention. This figure is an exploded view to more clearly disclose the various component parts.

The sub assembly incorporates inboard and outboard friction pad assemblies (11 and 12 respectively), each of which incorporates a support plate (13, 14) and a friction pad (15, 16). Typically, each friction pad is bonded or riveted to its respective support plate to transmit shear load.

Figure 15:
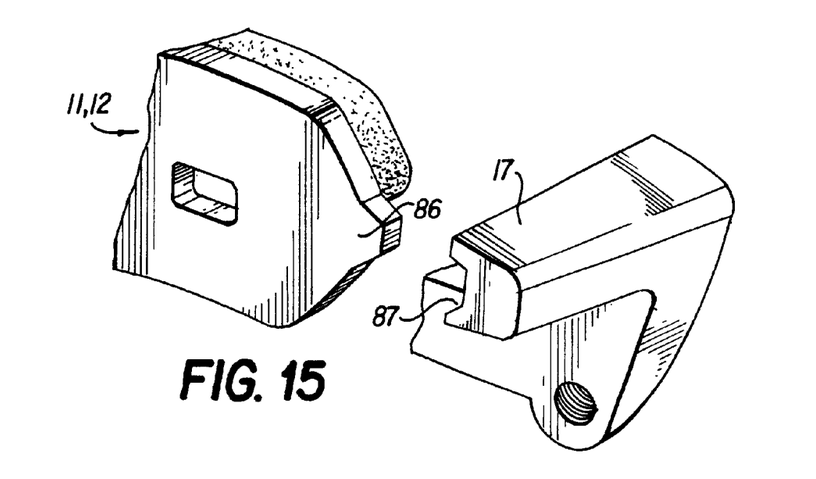
FIG. 15 is a partial exploded perspective view of a variation of the pad assembly anchor bracket of a disc brake sub assembly.

An anchor bracket 17 is adapted to be mounted to a motor vehicle through mounting holes 18. Guide rails 19 extend along opposing sides of the bracket to support the inboard and outboard assemblies. Cooperable slots 20 are located on the respective inboard and outboard assemblies 11, 12 and receive the guide rails enabling the assemblies to be slidably mounted on the anchor 17 in a direction away or towards each other. It should be appreciated that the pad assemblies may be secured to the anchor bracket 17 in other ways, such as with slideways located on the anchor bracket arranged to receive respective ends of the assemblies, or by a pin guided arrangement. Once such arrangement is disclosed in FIG. 15 where the pad assemblies 11 and 12 include laterally extending protrusions 86. The anchor bracket 17 includes sideways 87 which are configured to receive the protrusions 86. With either of these arrangements, the pad assemblies are slidably mounted on the anchor 17. Furthermore torque loading induced on the pad assemblies can be translated to the anchor bracket 17 via theses connections.

Figure 2:
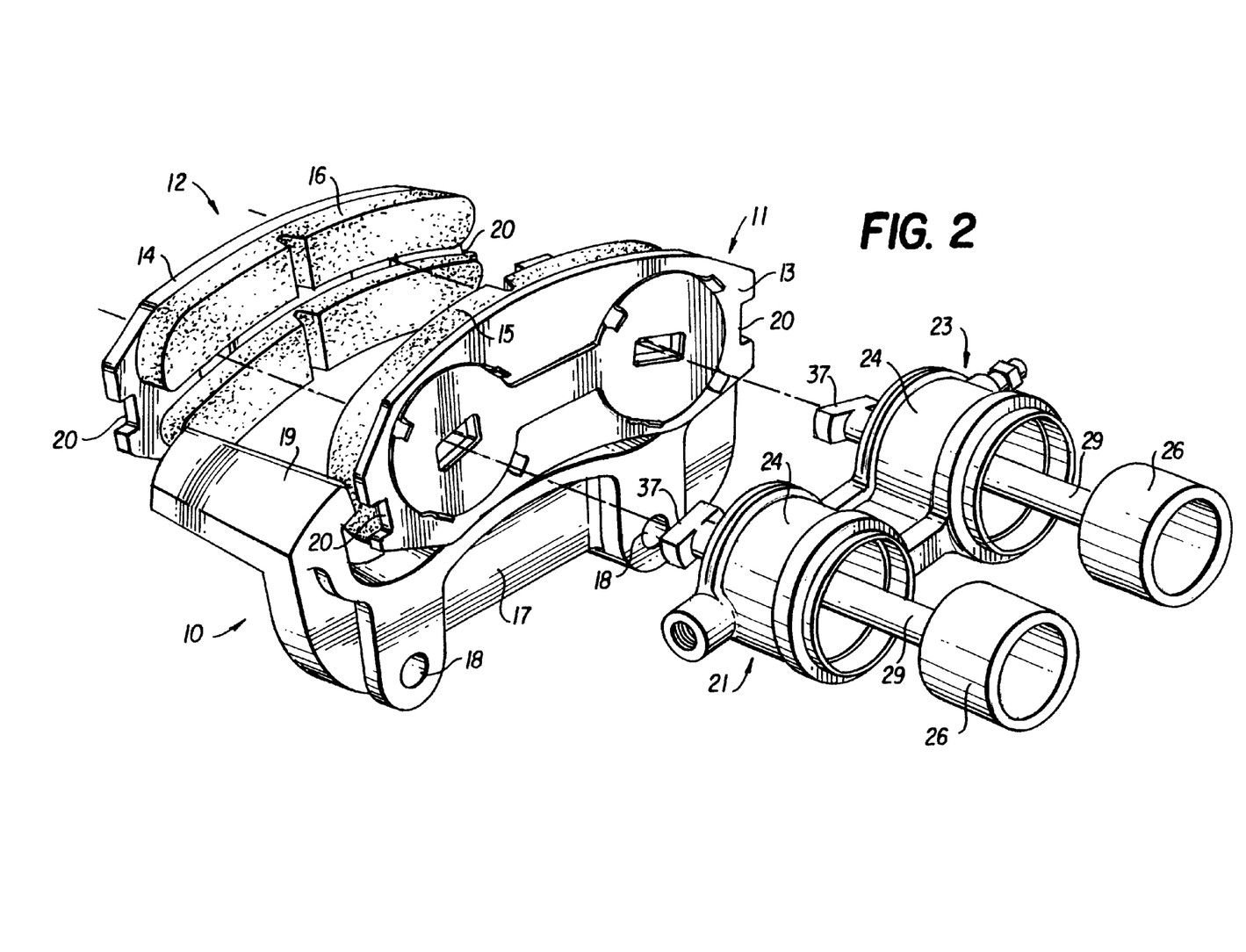
FIG. 2 illustrates an exploded perspective view of a sub assembly for a disc brake assembly according to a second embodiment of the invention.
Figure 7:
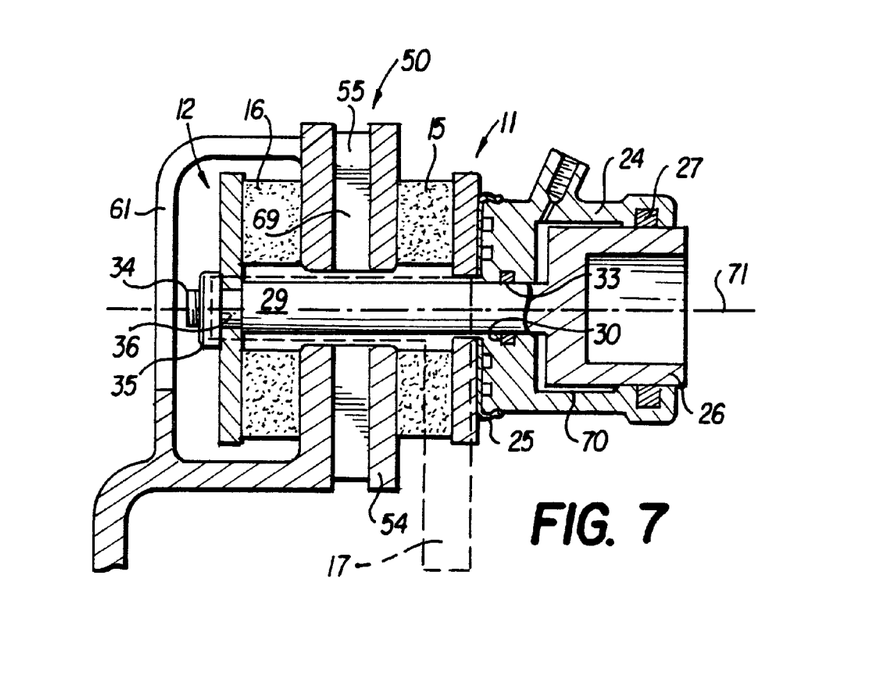
FIG. 7 is a sectional view along section line VII—VII of FIG. 6 and illustrating a full cast disc.

Two cylinder piston assemblies (22, 23) form the actuating means 21 of the sub assembly 10. In the embodiments of FIGS. 1 and 2, each cylinder piston assembly includes a cylinder 24 mounted to the inboard pad assembly through bracket 25, and piston 26. The piston 26 is slideable within the cylinder 24 along a movement axis 71 (FIG. 7) and movable in a direction away or towards the support plate 13 of the inboard assembly 11 under hydraulic pressure. A seal 27 (FIG. 7) is located between the piston 26 and cylinder 24 and a boot (not shown) is located on the cylinder on the inboard side of the seal 27. It should be realised that a single cylinder could be used and that the number of cylinders in the assembly 10 may vary depending on the size of the assembly as well as the specific torque output required. Furthermore, the cylinders may be secured to the support plate 13 in any suitable form including integrally forming the cylinders with the support plate. Furthermore, it may be desirable to have only a reduced contact area between the cylinder and the plate and this arrangement is illustrated in FIG. 7.

Force transmitting means 28 is associated with the actuating means 21 to provide at least part of an interconnection between the pad assemblies such that the inboard assembly responds to movement of the outboard assembly towards or away from the disc. In the first embodiment, the force transmitting means 28 is in the form of draw bars or rods 29 associated with each cylinder piston assembly and, each of which has an axis which extend coaxial with the movement axis 71. In FIG. 1, the rods 29 are integrally formed with respective pistons 26. The rods pass through apertures (30, 31, 32) in the respective cylinders 24 and pad assemblies 11 and 12 and are secured to the outboard support plate 14. The rods 29 are slideable within the apertures 30 and 31 enabling the rods to be movable relative to the cylinders 24 and the inboard pad assembly 11. A seal 33 (FIG. 7) is provided in the respective apertures 30 to seal between the respective rods 29 and the cylinders 24.

Figure 16:
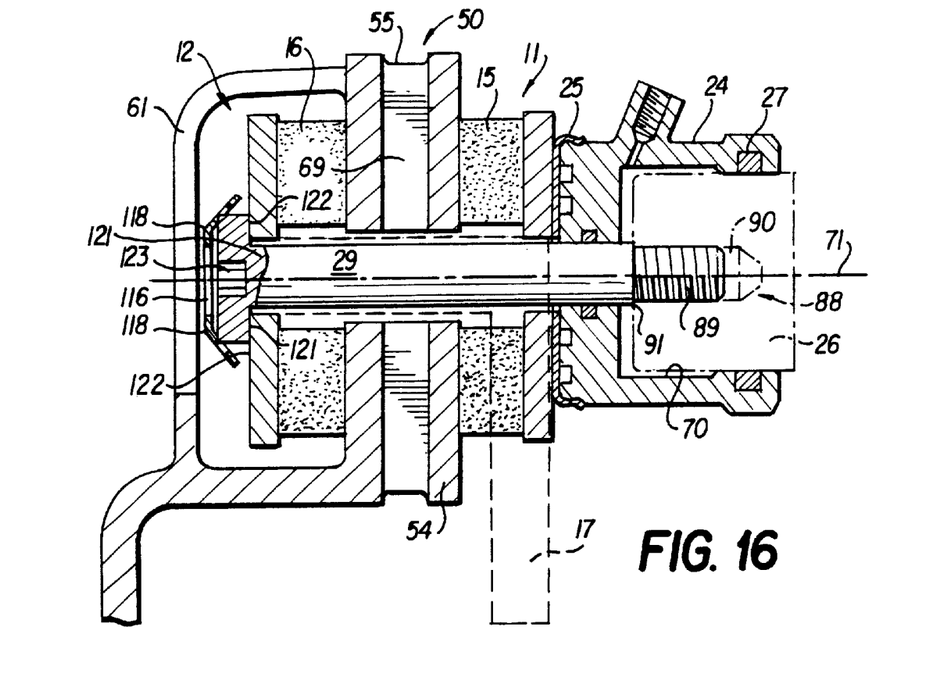
FIG. 16 is a sectional elevation of the disc brake assembly including the sub assembly of FIG. 2 with the draw bar fixedly secured to the piston.
Figure 17:
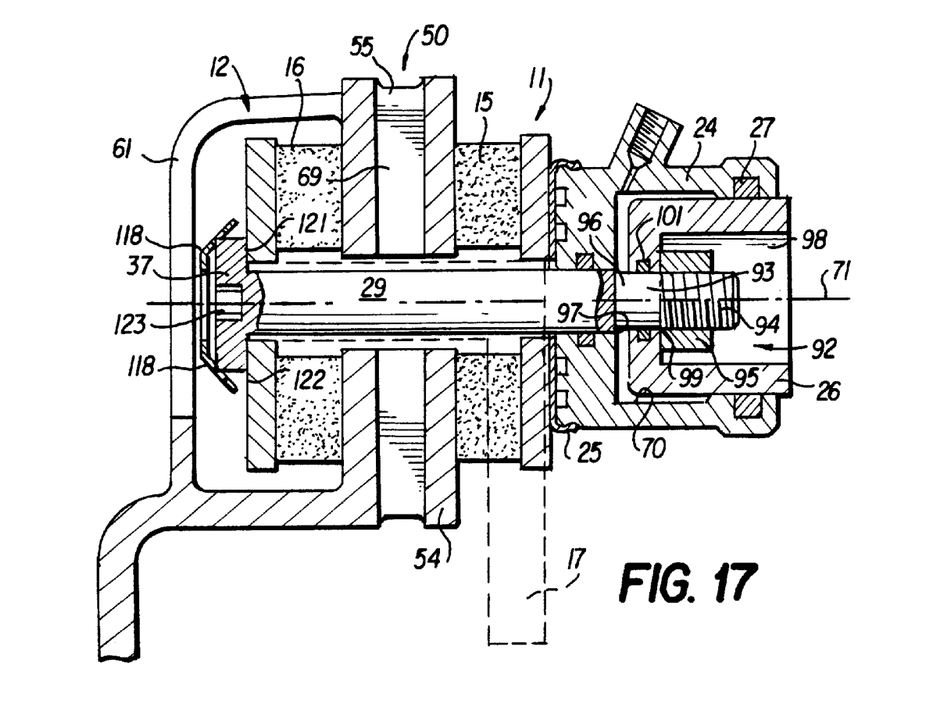
FIG. 17 is a variation of FIG. 16 with the draw bar connected to the pistion to enable relative movement.

Various different coupling arrangements between the rods 29 and the respective piston cylinder assemblies are illustrated in FIGS. 16 to 17. Each of these arrangements relate to a second embodiment of the disc brake assembly which is illustrated in FIG. 2 and which is described in more detail below. However it is appreciated that the coupling arrangements between rods and the piston cylinder assemblies could equally be used in conjunction with the disc brake assembly of FIG. 1.

In the version illustrated with reference to FIG. 16, the rod 29 is connected to the piston 26 via a screw threaded arrangement 88. In this arrangement the rod includes a threaded shaft 89 which is receivable in a complementary threaded hole 90 formed in the piston 26. The piston 26 it is arranged to be tightened into engagement with a shoulder 91 of the rod to thereby fixedly secure the piston 26 to the rod 29 so as to prevent relative movement between the rod 29 and the piston 26.

In contrast, in the arrangement illustrated in FIG. 17, the coupling between the piston 26 and the rod 29 is designed to allow relative movement between the rod and the piston so that the rod 29 is capable of rotation about its axis 71 relative to the piston 26 whilst being restrained from relative axial movement in the direction of the rod axis. In the coupling illustrated in FIG. 17, the rod 29 includes an end region 92 which is stepped to include first and second parts (93 and 94) of increasingly reduced diameter. The second part 94 is threaded and adapted to receive a nut 95. The end region 92 passes through an aperture 96 in the piston. The aperture is dimensioned so as to be less than the diameter of the main part of the rod 29 so that the piston 26 abuts against a shoulder 97 formed between the main part of the rod 29 and the first part 93.

The length of the first part 93 is arranged to be slightly longer than the aperture 96 so that the first part extends into a cavity 98 formed in the piston 26. With this arrangement the nut 95 is arranged to be screwed against a shoulder 99 formed between the first part 93 and the second part 94 of the rod 29. This causes the piston to be captured between the nut 95 and the abutment surface 97 thereby preventing relative axial movement between the piston 26 and the rod 29 beyond that provide by the clearance obtained by making the length of the first part 93 longer than the apature 96. However this arrangement allows for rotation of the rod 29 relative to the piston 26 about the rod axis 71. A seal 101 is provided to cause a fluid tight seal between the piston and the first part 93 of the rod 29.

If it is required in the embodiment of FIG. 17, that the rod 29 be fixed to the piston 26, the second part 94 could be shortened to be less than the aperture 96 so that the nut 95 bears against the cavity 98 thereby preventing relative rotation between the rod and the piston.

Figure 18:
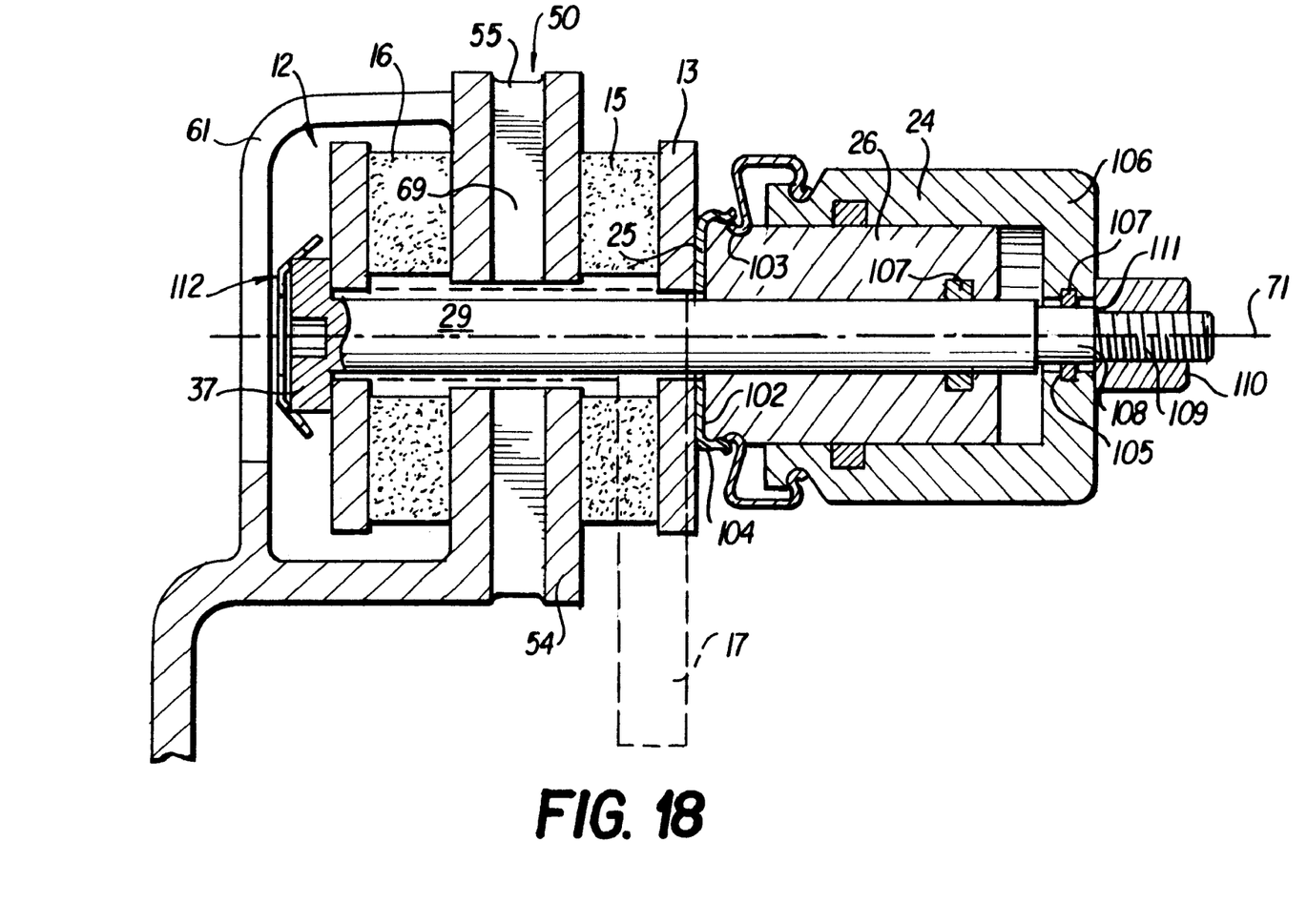
FIG. 18 is a further variation of the brake pad assembly of FIG. 16 with the draw bar coupled to the cylinder.

In the arrangement of FIG. 18, the rod 29 is secured to the cylinder 24 rather than to the piston 26. In this arrangement the piston is releasably coupled to support plate 13 of the inboard pad assembly 11 by a bracket 102 which operates in a similar fashion to the bracket 25. The bracket 102 is secured to the back plate 13 and includes a radially inwardly directed bead 103 which is adapted to locate within a corresponding annular groove 104 formed in the piston 26.

The rod 29 passes both through the piston 26 and through aperture 105 formed on an end surface 106 of the cylinder 24. Seals 107 provide a fluid tight seal between the rod 29 and the cylinder 26 and cylinder 24 respectively. Similar to the arrangement of FIG. 17, the rod 29 is stepped to include first and second parts (108 and 109 respectively) of increasingly reduced diameter with the second part being threaded to receive a nut 110. With this arrangement, the nut is adapted to be tightened against a shoulder 111 formed between the first and second parts. The first part extends through the aperture 105 and the rod is dimensioned so that the first part is captured in the aperture by the nut bearing against the shoulder 111 and the main part of the rod 29 bearing against the inner surface of the cylinder 24. The first part 108 is slightly longer than the aperture 105 so as to restrain the rod from axial movement relative to the cylinder. Limited axial movement is provided by the dimensions of the first part and the aperture. This ensures that the rod is able to rotate relative to the cylinder without binding and also assists in allowing a positive running clearance to be established on release of the brakes by the restoring forces of the seals 107 acting on the rod 29.

In the arrangement of FIG. 1, to secure the rod 29 to the outboard pad assembly 12, each rod incorporates a threaded stud 34 on its outer end which is arranged to receive a cooperable nut 35. Furthermore, the rod 29 is keyed to the support plate 14 to prevent relative rotation thereof during tightening of the nut 35 by a portion 36 located adjacent the stud 34 and having a rectangular or any other non-circular shape cross-section which is received in the suitably shaped aperture 32 in the outboard support plate. Furthermore, the rods 29 are positioned across the support plate 14 at a position to optimise the load distribution induced on the plate 14 by the rods 29. In this arrangement, as there are two rods, the friction pad 16 may be divided notionally into two regions with each rod connected at a centre of a respective one of the regions. To evenly distribute the load across the plate the size of each region would be proportional to the expected actuation load induced by each rod. In the illustrated case as each rod is expected to transmit half the actuation load, the size of these regions is approximately the same.

FIG. 2 illustrates a different arrangement, where each rod 29 incorporates an enlarged T-shaped head portion 37 and each aperture (31, 32) in the pad assemblies is elongated to accommodate entry of the respective head portions. Each slot has relative to the central axis of the passage a radial dimension which is larger in the direction across the pad than in an orthogonal direction extending between the inner and outer edges. The rods 29 are arranged to be secured to the outboard support plate 14, once the respective heads have passed through apertures 32, by rotating the rods through 90°. The heads are biased towards support plate 14 to minimise rattle by spring clip 112. At the same time this clip also acts as an antirotational device for the head.

FIGS. 12 to 14 and 16 illustrate the constructions of the clip 112 and the coupling arrangement between the outboard pad assembly and the T-shaped head 27 of the rods 29.

In the illustrated form, a clip assembly 113 which incorporates a pair of clips 112 and base a plate 114 is secured to the support plate 14 of the outboard pad assembly with each clip 112 being aligned over the elongate aperture 32 of that pad assembly. Each clip 112 includes a body 115 which is formed from resiliently deformable sheet material. The clip 112 is formed out of plane so as to have a generally arcuate cross section in elevation as best illustrated in FIG. 16. The body 115 includes a central aperture 116 aligned over a respective one of the apertures 32 and has two laterally adjacent slots 117 separated by marginal regions 118. Each of the slots 117 include an inner surface 119.

Figures 13, 14:
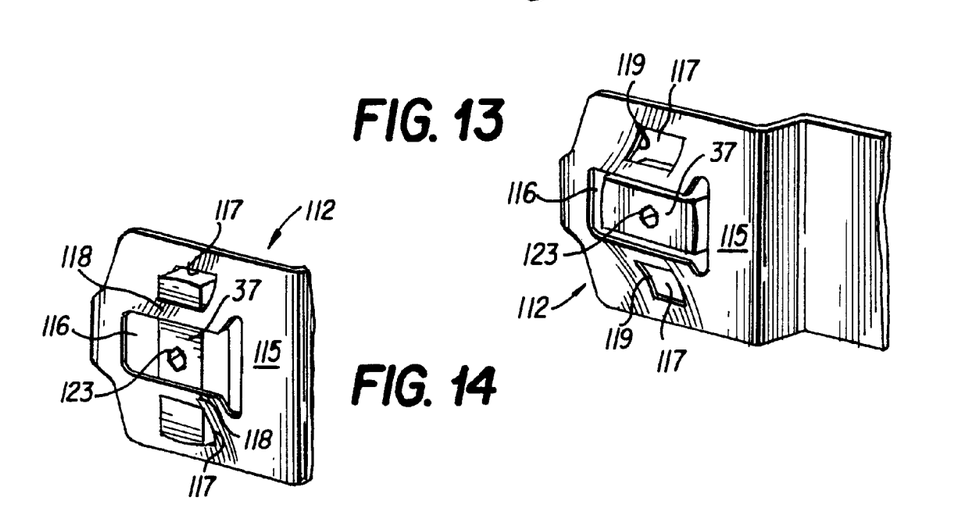
FIG. 13 is a detailed view to an enlarged scale of the interconnection between the draw bar head and the pad assembly clip of the sub assembly of FIG. 2 with the draw bar in a released configuration with the pad assembly.
FIG. 14 illustrates the view of FIG. 13 with the draw bar in an engaged configuration with the pad assembly.

FIG. 13 illustrates the head in a released configuration with the outboard pad assembly. In this position the head is aligned with the aperture 32 so that it can pass through the aperture 32 in the outboard pad assembly 12. A space 120 is provided between the clip 112 and the support plate 14 which is configured to accommodate the head portion 37 when it has passed through the support plate 14 in this released configuration.

To couple the outboard pad assembly 12 to the rod 29, the head is rotated through 90° from the position of FIG. 13 to the position illustrated in FIG. 14. In this engaged configuration, the head is arranged to locate within the laterally adjacent slots 118. Furthermore rotation between the released position of FIG. 13 and the engaged position of FIG. 14 causes the clip 112 to deform outwardly such that the marginal regions 118 are biased into engagement with the end surface of the head 37. In this position, the inner surface 119 of the lateral slot 117 inhibit rotation of the rod 29 about its axis 71. Furthermore the head 37 is biased into engagement with the support plate 14 by the applied force of the marginal regions 118 of the clip.

As best illustrated in FIG. 16, when in the engaged position of FIG. 14, an inner surface 121 of the head portion 37 is arranged to abut a region 122 of the support plate 14 adjacent the aperture 32, thereby preventing release of rod 29 from the outboard pad assembly 12.

As will be appreciated, this coupling arrangement provides a convenient yet secure means of coupling the outboard pad assembly to the draw bar. This arrangement provides greater ease of serviceability as compared to the nut and bolt arrangement of the brake assembly of FIG. 1 and provides improved safety. In the arrangement where a locking nut is used to secure the rod to the outboard pad assembly, a minimum torque loading needs to be applied to the nut to ensure that a secure connection is made. There is no such requirement in the coupling of the FIG. 2 assembly.

The head portion 27 of the rod 29 further includes a drive coupling 123 which enables a torque loading to be applied to the draw bar to enable it to be rotated between its released and engaged configuration from the outboard side of the disc brake assembly. This drive coupling can be accessed through the central aperture 116.

Whilst the illustrated arrangement discloses only a T-shaped head portion 37 it is to be appreciated that the head portion could be formed in a variety of non circular shapes. For example, the head portion could be configured to have any number of abutment surface 121 angular spaced about the rod axis 71. Of course, the passage would need to be configured to accommodate each of these abutment surfaces to allow the rod to pass through the pad assembly.

Referring back to the different embodiments in FIGS. 16 to 18, in the embodiment of FIG. 16, rotation of the rod 29 between the released configuration to the engaged configuration causes a corresponding rotation of the piston 26 within the cylinder 24. In contrast, in the versions of FIGS. 17 and 18, the rod can rotate about its axis 71 without causing any corresponding rotation of the piston in FIG. 17 or the cylinder in FIG. 18.

The friction pad (15, 16) of each pad assembly (11, 12) provides operative surface (38, 39) which in use is arranged to engage respective sides of a disc 50 (FIG. 7). While the friction pad may be unitary, in the illustrated arrangement, the operative surface of the respective pad assemblies incorporates channels 40 and 41 which divide each operative surface into four discrete parts. One channel 40 extends with respect to the axis of rotation of the disc, circumferentially across each pad assembly and incorporates the respective apertures (31, 32) to receive respective rods 29. The other channel 41 extends substantially radially. Other arrangements of channels may be provided if required.

Figure 8:
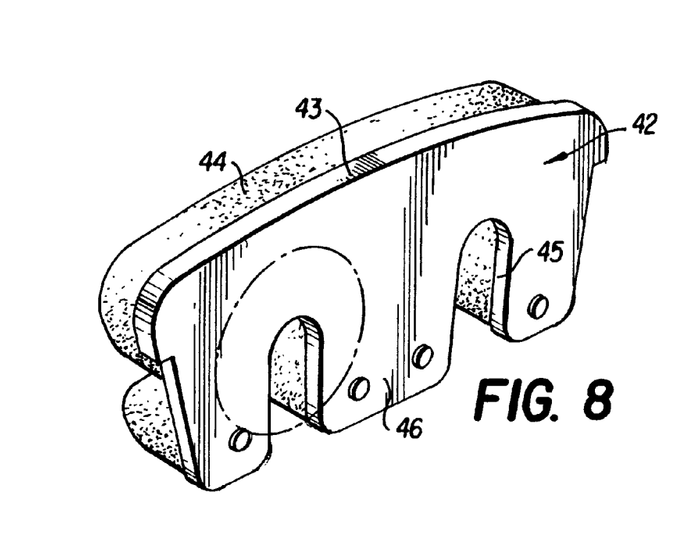
FIG. 8 is a perspective view of a variation of the brake pad assembly for use in the sub assembly of FIG. 1.

As illustrated in FIG. 8, a quick release pad assembly 42 is provided comprising a support plate 43 and friction pad 44. Apertures 45 are formed through the plate and pad which are arranged to receive respective rods 29. Each aperture is in the form of a radial slot which extends preferably from the radially lower edge 46 of the pad assembly 42 to enable quick release of the pad assembly from the brake sub assembly.

Figures 3, 4:
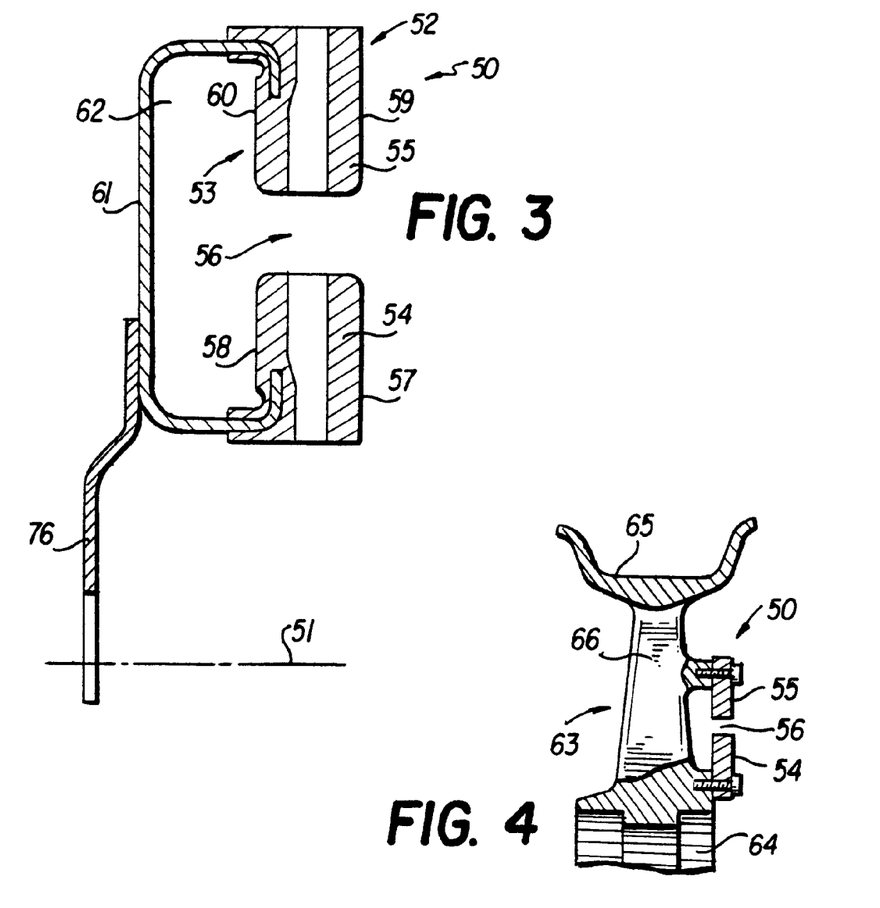
FIG. 3 is a sectional view of the first embodiment of a disc for use in a disc brake assembly according to the invention.
FIG. 4 is a sectional view of a second embodiment of a disc for use in the disc brake assembly according to the invention.

FIG. 3 illustrates a first embodiment of the disc 50 which may be used in association with the sub assembly 10 to form the disc brake assembly 100.

The disc 50 is arranged to rotate about an axis of rotation 51 and rotate with the motor vehicle. The disc has an inboard side 52 and an outboard side 53 and incorporates a radially inner portion 54 and a radially outer portion 55 which are separated by gap 56 extending in a continuous circle coaxial with the axis 51 of the disc.

Each portion (54, 55) has a respective inboard and outboard braking surface (57, 58, 59, 60) located on opposite sides of the disc 50. These braking surfaces provide the engagement surfaces for the operative surfaces (38, 39) of the respective pad assemblies.

A bracket 61 is located on the outboard side of the disc 50 and interconnects the inner and outer portions (54, 55). The bracket 61 is secured to the inner and outer portions and is spaced from the inner and outer portion outboard braking surfaces (58, 60) to provide a cavity 62 in which the outboard assembly 12 is located, enabling the operative surface 39 of the outboard assembly to engage the outboard braking surface (58, 60) of the inner and outer portions.

A second embodiment of the disc 50 is illustrated in FIG. 4. This disc is similar to the disc of FIG. 3 and incorporates the radially inner and outer portions (54, 55) separated by the gap 56. However in this arrangement, the disc forms part of the wheel assembly 63. The wheel assembly includes a hub 64, a rim 65, and a plurality of spokes 66 interconnecting the hub and rim. In FIG. 4, the inner and outer portions are bolted, or otherwise rigidly connected, to the wheel assembly 63. This arrangement is feasible for use where the wheel incurs little side loading (eg. in cornering) and therefore, is not subjected to bending of the rim relative to the hub. An example of such a situation would be with a motor cycle.

Figure 5:
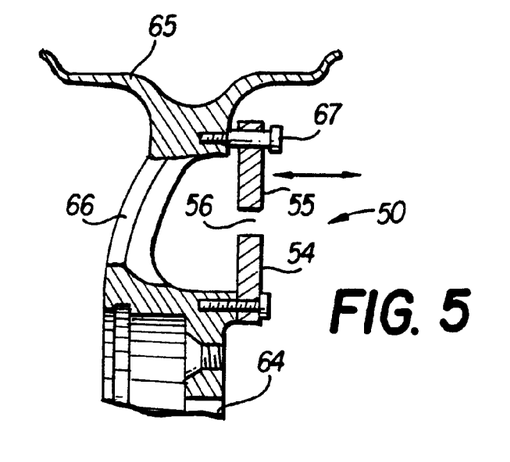
FIG. 5 is a variation of the disc of FIG. 4.
Figure 6:
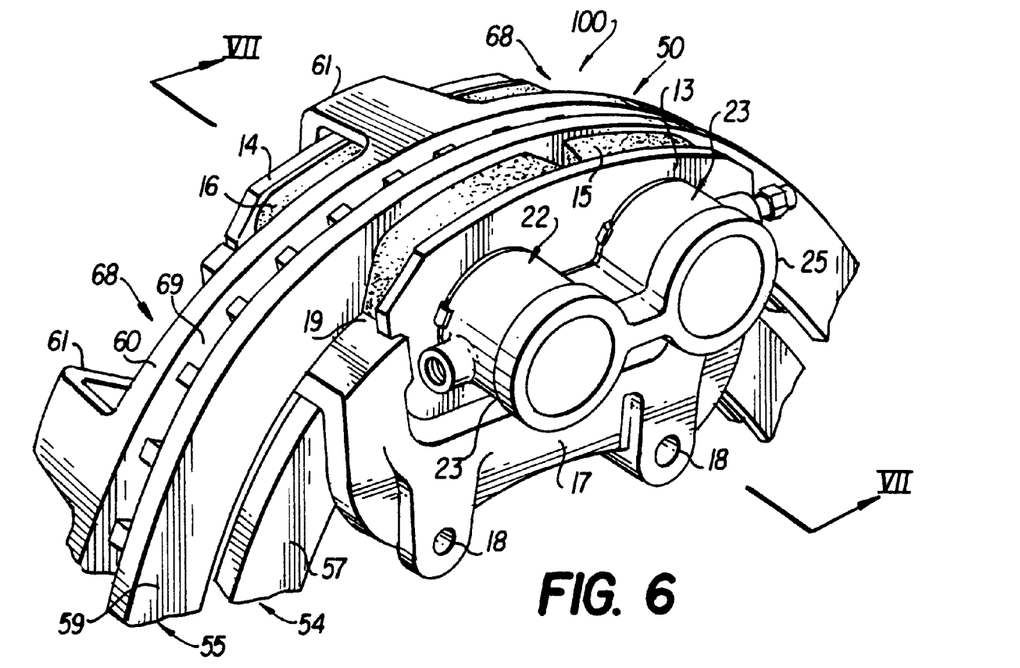
FIG. 6 is a perspective view of a disc brake assembly including the sub assembly of FIG. 1.

A variation of this disc 50 is illustrated in FIG. 5 which may be used in motor vehicles where cornering loads could deflect the rim relative to the hub. In this case, the inner portion 54 is fixed to the hub 64 and the outer portion is attached to the rim 65 or spoke 66 in a manner that allows limited movement in the axial direction such as through a spline 67 as illustrated, or through key/keyways or drives. In alternative arrangements (not shown), to maintain correct alignment of the inner and outer portions, the inner portion is movable relative to the hub in an axial direction, while the outer portion is fixed, or both the inner and outer portions are movable in the axial direction with the sub assembly being fixed to form a datum surface. A further embodiment of the disc is illustrated in FIG. 7 which comprises a fully cast disc 50. This disc is arranged to be connected solely to the hub and therefore deflection of the rim relative to the hub does not cause misalignment of the inner portion relative to the outer portion.

FIGS. 6, 7 and 16 to 18 illustrate the disc brake assembly 100 incorporating the sub assembly 10 and disc 50. The inboard and outboard pad assemblies (11, 12) are supported on the anchor bracket 17 and are located on opposing sides of the disc 50 with the guide rails 19 of the bracket 17 extending through the gap 56. The outboard pad assembly 12 is located in the cavity 62. The disc 50 includes a series of passages 68 which are formed in the bracket 61 to provide access to the cavity 62 and also improve ventilation around the disc. The cylinders 24 are connected to the inboard assembly 11 and the rods 29 are connected to the respective pistons 26 and extend through the gap 56 and are connected to the outboard pad assembly 12. The movement axis 71 of each piston relative the respective cylinder is substantially parallel to the axis of rotation 51 of the disc 50 and each piston 25 is arranged to move away from the inboard assembly in operation of the brake along the movement axis 71 with the rods 29 acting as a draw bar which draws the outboard assembly towards the inboard assembly causing the operative surface 39 to be drawn into engagement with the outboard braking surface (58, 60) of the disc 50. As the inboard assembly 11 is movable on the anchor bracket 17, on continued movement of the pistons 26 away from the inboard assembly 11, the inboard pad assembly is caused to move on the guide rails 19 on the bracket 17 to move the operative surface 38 of the inboard assembly 11 into engagement with the inboard face (57, 59) of the disc 50.

An advantage of the disc brake assembly 100 is that each rod 29 is much better able to accommodate the loads induced in operation of the assembly than prior art caliper bridge arrangements by virtue of the location of each rod relative to the operative surfaces and to the axis of movement of the respective pistons. In this arrangement, the loads induced at these operative surfaces are transferred substantially along each rod with little bending moment being applied with any drag load or torque induced at the respective pad assemblies being transferred to the anchor bracket through their point of contact on the guide rails 19. As a result, the brake assembly provides a much stiffer arrangement with deflection of the brake assembly due to operational loading being substantially reduced. As a result, the operative surface of the pad assemblies on the disc will not change under increased loading thus enabling the brake assembly to give a more consistent specific torque output under different loadings. Furthermore, with the stiffer construction, the pad assemblies may include larger surfaces and the piston cylinder arrangement is more efficient requiring a lower fluid displacement.

To inhibit binding of the piston within the cylinder without compromising the efficiency of the assembly, a portion 70 of the cylinder wall between seals 33 and 27 is relieved. In this way, the possibility of binding of the piston 26 can be reduced without compromising the effectiveness of the sealing arrangement between the piston 26 of the cylinder 24 or rod 29. A neat fit is provided between the cylinder and the piston or rod on either side of respective seals 33, 27. This ensures that extrusion of the seals does not occur which would otherwise increase fluid displacement. While the rod 29 takes very little bending movement, any side loading on the rod reacts against cylinder 27 at the location adjacent the seals 27, 33 which provide a bearing surface for the piston or rod.

Furthermore, as each rod is more efficient in accommodating the stresses induced in the assembly, and as a caliper bridge is no longer required, the brake assembly can be of lighter construction and manufacturing costs can be reduced. Furthermore, as it is not required to provide space for a caliper bridge on the radial extremity of the disc, a larger diameter disc is possible which provides a larger heat sink for the brake assembly, and a larger effective radius.

In addition the brake assembly 10 is well equipped to effectively dissipate heat in operation of the assembly. In relation to the disc, with the radial separation there is more surface area in the disc and vents 69 formed between the braking surface are shorter. Furthermore, the longitudinal channel 40 in each pad assembly is arranged to be located over the gap 56, providing a gap which allows air flow around the contact surfaces. The transverse channels 41 further assist in encouraging the air flow. Furthermore, with this arrangement, there is no caliper bridge or other structure to shield heat dissipation.

A further advantage is that the brake assembly may be more easily removed from the disc. As a caliper bridge is not required, once the rods are disconnected from the outboard pad assembly, the brake assembly may be withdrawn from the disc by being moved in the axial direction. Furthermore, the pad assemblies may be changed without removal of the wheel. For example, in the brake assembly shown in FIG. 2, the rods are released from the outboard pad assembly by being rotated through 90°, and this can be effected from the outboard side of the disc through passages 68. The inboard pad assembly and piston cylinder arrangement is then withdrawn from the disc in the axial direction and the outboard pad assembly is removed through the spokes in the wheel provided an adequate gap exists between adjacent spokes. A similar operation can be undertaken to install the new pad assemblies.

Further benefits can be realised in the disc brake assembly 100 by the design and method of manufacture of the disc 50.

The disc 50 may be formed in one piece or may be cast in separate pieces and assembled later. In one embodiment, the bracket 61 forms part of a centre support 76 which is secured to an axle for rotation with the vehicle. Typically the centre support is made from steel and is fabricated or pressed or formed from a combination thereof. The inner and outer portions (54, 55) of the disc are cast or otherwise formed on to the bracket. Each portion may be formed as a single piece or may be formed from a plurality of interfitting segments These portions may be cast from any suitable material including aluminium, metal matrix composition or cast iron. Alternatively, the bracket and inner and outer portions may be cast from a single material and integrally formed together as shown in FIG. 7.

To prepare the necessary inboard and outboard braking surfaces (57, 58, 59, 60), the portions may be machined using a chip producing process including grinding, turning and milling. The surfaces usually need to be planar and have a suitable surface texture to expedite burnishing of the friction pads.

Figure 9:
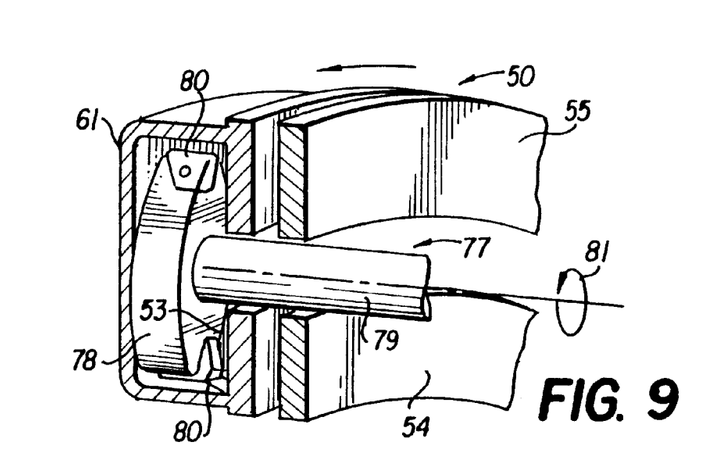
FIG. 9 illustrates a machining tool for preparation of the braking surfaces of the disc of the disc brake assembly.

FIG. 9 illustrates a suitable machining tool located in the disc 50 to provide the outboard braking surfaces (58, 60). The machining tool 77 incorporates a head 78 mounted on a rotatable shaft 79. Cutters 80 (which may include single point or multiple point cutting edges) are secured to the head and are spaced from the axis of rotation 81 of the shaft and are separated by an angle which is approximately 180°. The spacing determines the depth of the respective braking surface of the inner and outer portions.

To prepare the outboard braking surface, the tool is inserted in through the gap 56 within the disc 50. To facilitate insertion of the head 78 in through the gap 56, the machining tool 77 is of suitable shape, such as substantially T-shape as illustrated with the cross piece being arcuate to enable insertion into the gap 56 or in an alternative embodiment (not shown), of a substantially L-shaped configuration. To machine the face, the cutters 80 are located against the disc surface and the tool 77 rotates about the shaft causing the cutters to move against the disc surface. To vary the depth of the cut, relative axial movement between the tool and the disc is provided. The disc 50 is also caused to rotate to provide feed for the tool 77.

The relative speed of the rotation of the disc compared to the tool 77 determines the finish on the surface. If the disc rotates more slowly than the tool, a milling process occurs at the surface. If the disc rotates at a faster speed than the tool, then a process similar to a turning process occurs though the rake angle of the cutter would not remain constant as in an ideal turning process due to the rotation of the cutter shaft.

Figure 11:
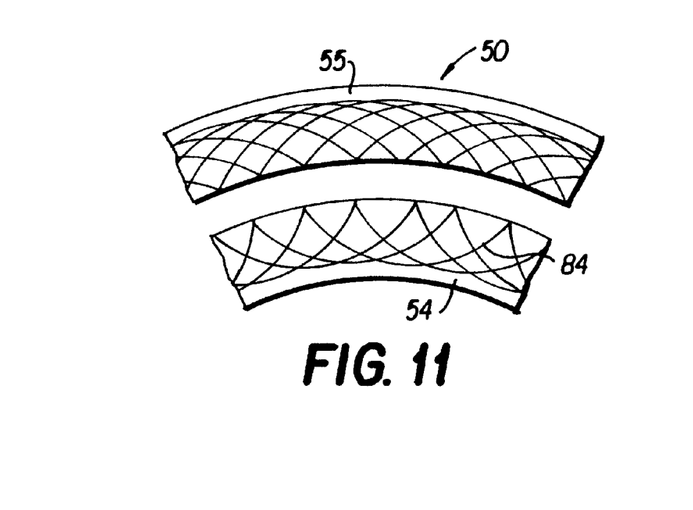
FIG. 11 is a schematic view of the braking surfaces on a disc using the machining tools of either FIG. 9 or 10.
Figure 12:
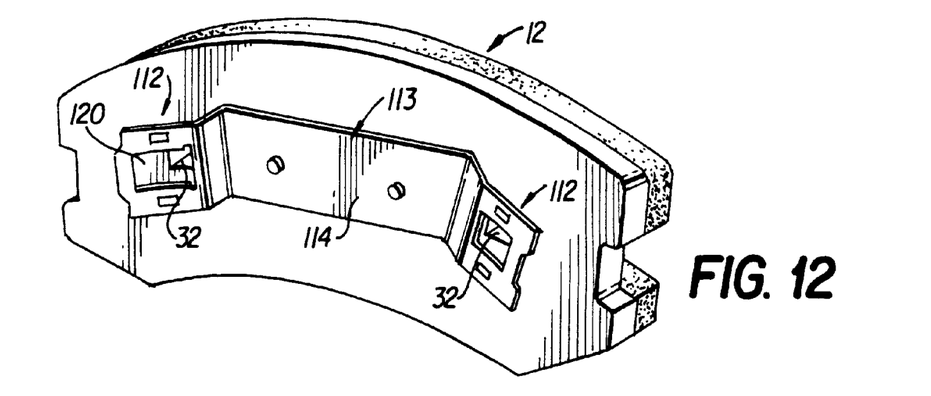
FIG. 12 is a rear perspective view of the outboard brake pad assembly for use in the sub assembly of FIG. 2.

The milling process is preferred because the resultant finished texture is of a cris-cross pattern 84 (which is illustrated in FIG. 11) which is believed to be better for burnishing the surface than the pattern produced by a turning process, which is similar to a spiral.

To prepare the inboard braking surface, a similar tool (not shown) is used except the cutters face outboard rather than inboard as in the tool 77. The inboard surface may be prepared separately or simultaneously with the preparation of the outboard surface. In the latter arrangement, the two machining tools would typically be spaced circumferentially about the disc.

Figure 10:
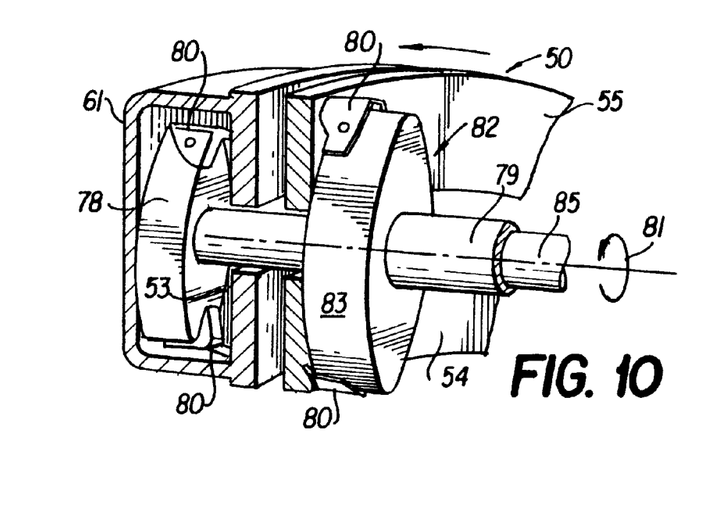
FIG. 10 is a variation of the machining tool of FIG. 9 incorporating two cutting heads.

An alternative tool 82 is illustrated in FIG. 10. This tool is substantially the same as the tool illustrated in FIG. 9 except that an additional head 83 is incorporated on a concentric shaft 85 in a position spaced from the head 78. In this arrangement, cutters are located on opposing faces of the heads 78 and 83 and as in the earlier embodiment, the cutters on each head are radially spaced from the axis of rotation of the shaft and separated by an angle which is approximately 180°, though other angles may be used. For example the angle may be 90° which may assist in minimising vibration. The concentric shaft 85 is provided to enable axial displacement between each head and the disc to enable the depth of cut to be varied.

With the tool 82 the inboard and outboard braking surfaces can be processed simultaneously thereby enabling the processing time to be further reduced. In other respects the tool 82 processes the faces on the disc in the same way as the earlier embodiment. In yet another alternative, two heads are provided spaced along the axis of the shaft with each head only having a single cutter which is arranged to cut a respective one of the opposing inboard and outboard faces. In this arrangement, each cutter is radially spaced from the axis of rotation of the shaft with the angle between the cutters about the axis of rotation being typically zero such that the cutters are arranged to straddle a particular portion of the disc, or at approximately 180° such that one cutter is arranged to engage the inner portion of the disc while the other cutter engages the outer portion or at any other relative angular position.

In an alternative arrangement (not shown) the first portion of the disc may be formed separately from the second portion and may be processed individually, or assembled, and then processed simultaneously. Each of these pieces may be formed in one uniform material or may be composite or incorporate inserted portions.

In the manufacture of the disc either as a single piece or in separate pieces, each portion may be solid or ventilated or the disc may be formed with one portion ventilated and the other solid depending on the performance characteristics required.

It will be appreciated from the foregoing description that the disc brake assembly, sub assembly and disc in accordance with the invention provides an arrangement which is better able to accommodate the loads involved in operation of the brake assembly while being of light weight construction, being relatively inexpensive and effective in dissipating heat.

Finally it is to be understood that various alterations, modifications and/or additions may be introduced into the construction and arrangements previously described without departing from the spirit or ambit of the invention described.

What is claimed is:

1. A disc brake assembly including a disc having an axis of rotation and including a radially outer portion and a radially inner portion, a gap forming a radial separation between said outer and inner portions and extending in a continuous circle co-axial with said axis of rotation, two pad assemblies located on respective opposite sides of said disc and each being mounted for movement towards and away from said disc, and actuating means operable to cause each said pad assembly to move towards and engage a respective adjacent said side of the disc and including force transmitting means which extends through said gap and provides at least part of an interconnection between said pad assemblies such that one responds to movement of the other towards or away from said disc, wherein said actuating means includes a piston cylinder assembly in which the piston is moveable relative to the cylinder, either the cylinder or the piston being connected to said other pad assembly for movement therewith and said force transmitting means includes a draw bar which extends along an axis and connects either said piston or said cylinder respectively to said one pad assembly, said draw bar being rotatable about its axis and includes a head portion and wherein said one pad assembly includes a passage configured to receive said head portion when disposed at a predetermined orientation relative to said one pad assembly to couple the one pad assembly to said draw bar, and wherein when coupled together, said draw bar is operative to move between an engaged configuration with said one pad assembly, where said head portion is in engagement with said one pad assembly so as to prevent removal of said draw bar from said passage, to a released configuration, where said draw bar is able to be released from said one pad assembly with the head portion being able to be withdrawn through said passage, on rotation about said draw bar axis.

2. A disc brake assembly according to claim 1, further including a retaining device operative to inhibit rotation of said draw bar when in engagement with said one pad assembly.

3. A disc brake assembly according to claim 2, further including biasing means to bias the draw bar towards the one pad assembly when in engagement with said one pad assembly.

4. A disc brake assembly according to claim 3, wherein said retaining device is in the form of a clip connected to or integrally formed with said one pad assembly, said clip including a resiliently deformable body which includes at least one cavity adapted to receive a part of the draw bar, the cavity incorporating an inner surface which is engagable with said draw bar to inhibit rotation of said draw bar about its axis.

5. A disc brake assembly according to claim 4, wherein said biasing means is formed as part of said clip and includes an abutment member which abuts the draw bar so as to bias the draw bar into engagement with said one pad assembly.

6. A disc brake assembly according to claim 5, wherein said clip is caused to deform when said draw bar is captured within said cavity to thereby bias said abutment member into engagement with said draw bar.

7. A disc brake assembly according to claim 1, wherein said draw bar is fixed relative to either the cylinder or the piston to which it is connected.

8. A disc brake assembly according to claim 1, wherein the connection between the draw bar and either the cylinder or piston to which it is connected allows for relative rotation about the axis of the draw bar but restrains the members from relative axial movement along said draw bar axis.

9. A disc brake assembly according to claim 1, wherein said head portion includes at least one abutment surface disposed radially outwardly from said draw bar axis and which faces towards said piston cylinder assembly, the assembly being configured such that in said engaged configuration, said abutment surface engages with a complimentary abutment surface of said one pad assembly so as to prevent removal of said draw bar from said passage, and wherein when in said released configuration, said abutment surface is locatable within said passage so as to enable said draw bar to be released from said one pad assembly.

10. A disc brake assembly according to claim 9, wherein said head portion includes a plurality of abutment surfaces angularly spaced about said draw bar axis.

11. A disc brake assembly according to claim 10, wherein said head portion is T-shaped having a pair of abutment surfaces spaced apart about said draw bar axis by approximately 180°.

12. A disc brake assembly according to claim 9, wherein said one pad assembly includes a support member having opposite first and second major surfaces, a friction lining connected to, or integrally formed with the support member along said first major surface to form an operative surface of the pad assembly and wherein said passage extends through said operative surface and at least into said support member.

13. A disc brake assembly according to claim 12, wherein said passage extends through to said second major surface of said support member and wherein a first end of said draw bar which is received in said passage is able to be accessed from said second major surface, said first end further including a drive coupling operative to transmit loading to rotate said draw bar about its axis.

14. A disc brake assembly according to claim 7, wherein a region of the operative surface corresponds to the passage, the region being approximately a size proportional to an expected actuation load induced on the operative surface by the draw bar received within the passage and wherein the passage is located substantially at the centre of that region.

15. A disc brake assembly according to claim 1, wherein said piston is movable relative to the cylinder along a movement axis and wherein said draw bar extends co-axial with said movement axis.

16. A disc brake assembly according to claim 1, wherein each said pad assembly overlies part of each of said outer and inner disc portions and is engagable with the respective said adjacent side of the disc at both said outer and inner portions.

17. A disc brake assembly according to claim 1, wherein said force transmitting means includes a plurality of said draw bars.

18. A disc brake assembly according to claim 17, wherein the actuation means includes a plurality of said piston cylinder assemblies each having a respective one of said draw bars connected thereto.

19. A disc brake assembly according to claim 1, further including an anchor bracket securable to a support structure, the anchor bracket including a pair of support elements arranged to extend through said gap to support said pad assemblies and accommodate torque loading induced in operation of the assembly.

20. A brake pad assembly for use in a disc brake assembly having an axis of rotation, the pad assembly including a support member and a friction lining connected to or integrally formed with the support member, a surface of the friction lining forming an operative surface of the pad assembly having relative to the axis of rotation, a radially outer and a radially inner edge interconnected by two side edges, the pad assembly incorporating at least one passage extending through said friction lining and at least into the support member, the or each passage being defined by an interior wall of said pad assembly and extending along an axis between first and second ends, the passage being non circular in cross section perpendicular to said axis so as to be able to receive an end of a draw bar having a non-axisymmetric shaped head when said draw bar is in a predetermined orientation relative to said pad assembly, the pad assembly includes an abutment surface adjacent said second end, and wherein when the draw bar is inserted through said passage and rotated about its central axis, the abutment surface is operative to engage with said head of said draw bar to couple the pad assembly to said draw bar to enable said draw bar to impart an actuating force to said pad assembly.

21. A brake pad assembly according to claim 20, further including a retaining device operative to inhibit rotation of the draw bar relative to the pad assembly when in engagement with said abutment surface.

22. A brake pad assembly according to claim 20, wherein the support member includes a first major surface on which the friction lining is located and a second major surface opposite said first surface, and wherein said passage extends through said support member to said second major surface.

23. A brake pad assembly according to claim 20, wherein the friction lining is separated into two parts by a space which extends circumferentially to the rotation axis of the disc with each part of the friction lining being engagable with a respective one of two radially separated portions of the disc.

24. A brake pad assembly according to claim 23, wherein the or each passage communicates with the channel, or at least one of said channels, formed in said friction lining.

25. A brake pad assembly according to claim 21, wherein said retaining device is in the form of a clip including a resiliently deformable body which includes at least one cavity adapted to receive a part of the draw bar, the cavity including an inner surface which is engagable with said draw bar to inhibit rotation of said draw bar about the passage axis.

26. A brake pad assembly according to claim 25, wherein the clip further includes an abutment member which abuts the draw bar so as to bias the draw bar into engagement with said one pad assembly.

27. A brake pad assembly according to claim 20, wherein a region of the operative surface corresponds to the or each passage, each region being approximately a size proportional to an expected actuation load induced on the operative surface by the draw bar received within the respective passage and wherein each passage is located substantially at the centre of that region.

28. A brake pad assembly according to claim 20, wherein each side edge of the support member includes an abutment surface, the abutment surfaces being engagable with respective support elements of the disc brake assembly to transfer torque loading from said brake pad assembly to said support elements on operation of said disc brake assembly.

29. A brake pad assembly according to claim 28, wherein the abutment surfaces are located in recesses formed in the said side edges of said support member, the recesses being adapted to receive the support elements of the disc brake assembly therein.

30. A brake pad assembly according to claim 28, wherein the side edges include laterally extending protrusion which incorporates said abutment surfaces, said protrusions being configured to be received in corresponding recesses located in the support elements of the disc brake assembly.

31. A disc brake assembly including a disk having an axis of rotation and including a radially outer portion and a radially inner portion, a gap forming a radial separation between set outer and inner portions and extending in a continuous circle co-axial with said axis of rotation, two pad assemblies located on respective opposite sides of said disc and each being mounted for movement towards and away from said disc, and actuating means operable to use each said pad assembly to move towards and engage a respective adjacent said side of the disc and including force transmitting means which extends through said gap and provides at least part of an interconnection between said pad assemblies such that one responds to movement of the other towards or away from said disc, wherein said actuating means includes a piston cylinder assembly in which the piston is movable relative to the cylinder, either the cylinder or the piston being connected to said other pad assembly for movement therewith and said force transmitting means including a draw bar which extends along an axis and connects either said piston or said cylinder respectively to said one pad assembly, said draw bar being rotatable about its axis and includes a T-shaped head portion having a pair of abutment surfaces facing towards said piston cylinder assembly and which are spaced apart about said draw bar axis by approximately 180°, and wherein said one pad assembly includes a passage configured to received said T-shaped head portion when disposed at a predetermined orientation relative to said one pad assembly to couple the one pad assembly to said draw bar, and wherein when coupled together, said draw bar is operative to move between an engaged configuration wherein said abutment surfaces of said T-shaped head portion engages with complementary abutment surfaces of said one pad assembly so as to prevent removal of said draw bar from said passage, to a released configuration where said abutment surfaces of said head portion are aligned with said passage so as to enable said draw bar to be released from said one pad assembly with the head portion being able to be withdrawn through said passage, on rotation about said draw bar axis.

32. A brake sub-assembly for use on a disc brake assembly incorporating a disc, the brake sub-assembly including two pad assemblies separated by a space, and actuating means operable to cause relative movement of the pad assemblies to vary said space, the actuating means including force transmitting means providing at least part of an interconnection between said pad assemblies such that one responds to movement of the other to vary said space, and a piston cylinder assembly in which the piston is movable relative to the cylinder along a movement axis, either the cylinder or the piston being connected to said other pad assembly for movement therewith, and said force transmitting means including a draw bar extending along an axis co-axial with said movement axis and connecting either said piston or said cylinder respectively to said one pad assembly, said draw bar being rotatable about its axis and includes a head portion and wherein said one pad assembly includes a passage configured to receive said head portion when disposed at a predetermined orientation relative to said one pad assembly to couple the one pad assembly to said draw bar, and wherein when coupled together, said draw bar is operative to move between an engaged configuration with said one pad assembly, where said head portion is in engagement with said one pad assembly so as to prevent removal of said draw bar from said passage, to a released configuration, where said draw bar is able to be released from said one pad assembly with the head portion being able to be withdrawn through said passage, on rotation about said draw bar axis.

* * * * *